No. 770,870. PATENTED SEPT. 27, 1904.
P. L. SLEEPER.
ATTACHMENT FOR CULTIVATORS.
APPLICATION FILED NOV. 18, 1903.
NO MODEL.
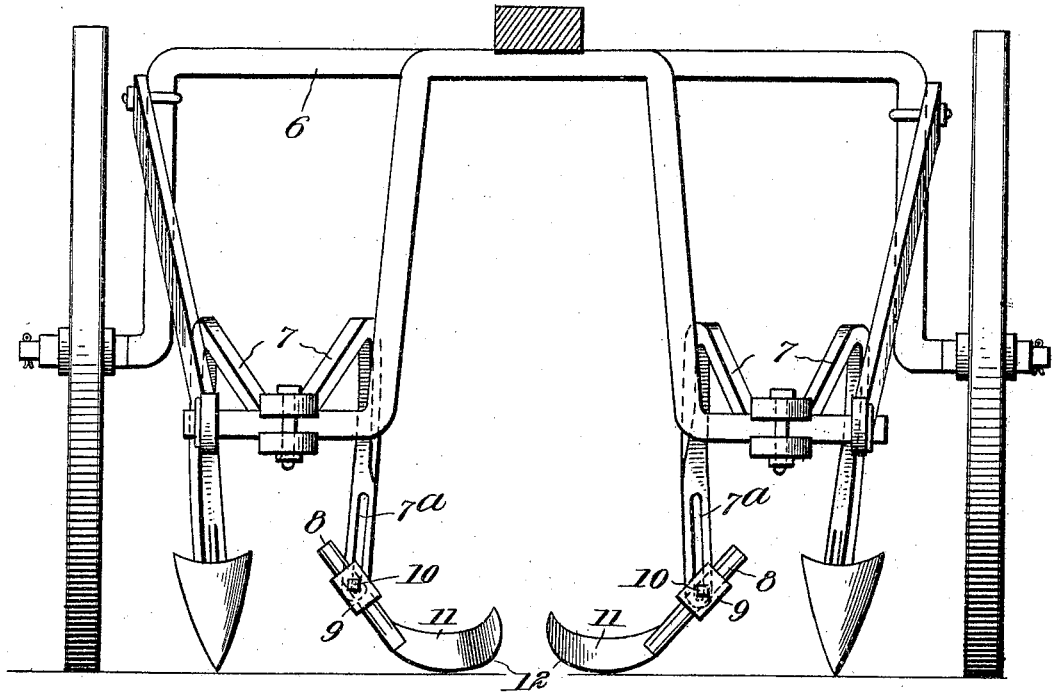
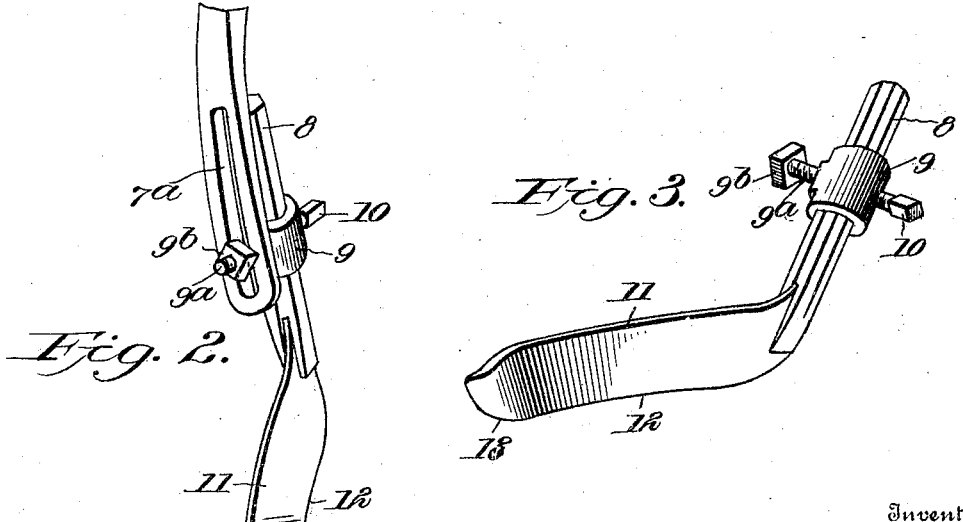
Witnesses
C. H. Walker
Geo. E. Few
Inventor
Philemon L. Sleeper
By Nies B. Stevens & Co.
Attorneys No. 770,870. Patented September 27, 1904.

UNITED STATES PATENT OFFICE.

PHILEMON LEE SLEEPER, OF EAKLY, OKLAHOMA TERRITORY.

ATTACHMENT FOR CULTIVATORS.

SPECIFICATION forming part of Letters Patent No. 770,870, dated September 27, 1904.

Application filed November 18, 1903. Serial No. 181,673. (No model.)

*To all whom it may concern:*

Be it known that I, PHILEMON LEE SLEEPER, a citizen of the United States, residing at Eakly, in the county of Caddo and Territory of Oklahoma, have invented new and useful Improvements in Attachments for Cultivators, of which the following is a specification.

This invention relates particularly to a weeder attachment for cultivators, and especially to wheeled straddle-row cultivators, and in addition to its use as a weeder it may be used to excellent advantage to plow very young corn, cotton, or the like, where the ordinary shovel would throw too much dirt.

The object of the invention is to produce an improved device of the kind stated characterized by novelty of construction and adjustment and by great utility for purposes of tillage of crops grown in rows.

In the accompanying drawings, Figure 1 is a front elevation of part of a straddle-row cultivator with my invention applied thereto for use as a weeder. Fig. 2 is a perspective view showing the attachment adjusted as a plow, and Fig. 3 is a perspective of the attachment detached.

The device is intended to be attached to the beam of an ordinary straddle-row cultivator, in substitution for one of the ordinary cultivator-teeth, which is removed for that purpose.

Referring specifically to the drawings, 6 indicates the axle of a straddle-row cultivator, and 7 the beams thereof. To the foot of one of these beams, preferably the inside one on each side, my device is attached.

The device has a shank 8, preferably of octagonal form, so that it may be securely bound in its clip 9 by a screw 10, the point of which bears against one of the octagonal faces. It is obvious that the shank may be made round or with various numbers of sides, the intent being to permit both axial and lengthwise adjustment of the shank 8 in the clip to adjust the blade in or out or to turn it up or down. The blade is indicated at 11 and is fastened to one end of the shank, as by welding or otherwise. It is offset laterally or backwardly from the axial line of the shank and has its cutting edge 12 presented downwardly and forwardly. It is slightly curved throughout the most of its length and at the rear end is bent up to a greater degree, as indicated at 13, at such an inclination as would substantially accord with the slope of the hill forming the row in which the crops are planted when the body of the blade is in its horizontal position, as shown in Fig. 1. The clip 9 terminates in a threaded stem $9^a$, which in use is placed in the slot $7^a$ of the beam and there fixed by the nut $9^b$ on the back side of the beam. This permits the clip 9, and consequently the blade, to be turned in the axis of the screw $9^a$, so that the inclination of the blade may be varied to any degree between the horizontal and the perpendicular. When used as a weeder, the clip is so set that the blade extends in substantially a horizontal position, and by reason of the rearward extension of the blade with respect to the shank the cutting edge 12 is presented at an angle to the line of draft and the tool is so set that the blade runs just under the surface of the ground, when it will cut off or lift out the weeds. The inclination of the blade may be adjusted in the axis of the shank to give the blade the proper or most efficient cut.

In use as a plow for very young plants, as indicated in Fig. 2, the clip is turned until the shank is in substantially a vertical position, in which case the main part of the blade will stand so as to cut vertically into the ground, and the curved end 13 will act to throw the earth to the plants and hill up a slight ridge. In this use a lengthwise adjustment of the shank 8 permits the blade to be run as deep or as shallow as desired, while the axial adjustment of the shank permits the rear end of the blade to be run as close to the row as desired.

It will be understood that in straddle-row work two of the attachments are used, one on each side; but the scope of the invention is not limited to use with any particular cultivator nor otherwise than is indicated in the following claims.

What I claim as new, and desire to secure by Letters Patent, is—

1. The combination with a cultivator-beam having a slotted downturned end, of a weeder attachment comprising a clip having a pivot-stem extending into the slot, the axis of the stem being substantially horizontal and lengthwise of the cultivator, and a cutting-blade having a shank adjustably held in the clip, to swing therewith on the pivot in a vertical plane, the shank and the blade extending laterally from the beam.

2. The combination with a cultivator-beam having a downturned end with a vertical slot therein, of a weeder attachment comprising a clip having a pivot-stem rotatable and vertically adjustable in the slot, a rotatable shank held by the clip and adjustable lengthwise therein, and a curved blade offset backwardly from the shank.

In testimony whereof I have signed my name to this specification in the presence of two subscribing witnesses.

PHILEMON LEE SLEEPER.

Witnesses:
FRED R. KERN,
W. H. PORTER.